United States Patent [19]

Kase et al.

[11] Patent Number: 5,751,491
[45] Date of Patent: May 12, 1998

[54] METHOD OF ADJUSTING BEAM AXIS OF OPTICAL PICK-UP

[75] Inventors: Toshiyuki Kase; Hiroshi Nishikawa, both of Tokyo, Japan

[73] Assignee: Asahi Kogaku Kogyo Kabushiki Kaisha, Tokyo, Japan

[21] Appl. No.: 677,277

[22] Filed: Jul. 9, 1996

[30] Foreign Application Priority Data

Jul. 10, 1995 [JP] Japan ............................ 7-173435

[51] Int. Cl.$^6$ ...................... G02B 27/10; G02B 7/02
[52] U.S. Cl. ........................................ 359/618; 359/823
[58] Field of Search ............................... 359/618, 813, 359/822, 823, 211, 223

[56] References Cited

U.S. PATENT DOCUMENTS

| | | | |
|---|---|---|---|
| 4,850,686 | 7/1989 | Morimoto et al. | 350/484 |
| 5,223,970 | 6/1993 | Oono et al. | 359/223 |
| 5,237,457 | 8/1993 | Oono et al. | 359/837 |
| 5,249,173 | 9/1993 | Tanaka | 369/119 |
| 5,341,246 | 8/1994 | Oono et al. | 359/837 |
| 5,343,332 | 8/1994 | Oono et al. | 359/837 |
| 5,546,238 | 8/1996 | Devenyi | 359/823 |
| 5,576,897 | 11/1996 | Kuo | 359/822 |
| 5,631,776 | 5/1997 | Weigand et al. | 359/694 |

*Primary Examiner*—David C. Nelms
*Assistant Examiner*—Ricky Mack
*Attorney, Agent, or Firm*—Greenblum & Bernstein P.L.C.

[57] ABSTRACT

A light beam emitted from a laser diode passes through a polarization beam splitter, a movable mirror, a reference prism supported in a pair of rails, a sliding mirror and is incident on a cat's-eye optical system. The light beam reflected in the cat's-eye optical system returns to the polarization beam splitter along an optical path of the incident light beam, is separated by a polarizing separating plane and is directed to a television camera. The front surface of the reference prism is perpendicular to the rails. Thus, the light beam reflected at the front surface of the reference prism is directed to the television camera along an optical path which is inclined relative to the optical path of the incident light beam in accordance with the direction of the rails. Consequently, if the inclination of the movable mirror is adjusted such that the light spots of both of the reflected beams displayed on the monitor coincide, the optical path of the incident light beam is parallel to the rails.

11 Claims, 3 Drawing Sheets

METHOD OF ADJUSTING BEAM AXIS OF OPTICAL PICK-UP

BACKGROUND OF THE INVENTION

1. Field of the Invention

The present invention relates to a method of adjusting a beam axis of an optical pick-up used in an optical disc device for magneto-optic discs and the like.

2. Description of the Related Art

An optical disc device irradiates light beams to form a spot on to the surface of the disc and reads information which is recorded on the surface of the disc based on changes in the state of the light beams which are reflected from the surface. Among such optical disc devices, a magneto-optic disc device records digitalized information as a magnetized direction of each magnetic domains of a magnetic film formed on the surface of the disc by irradiating high energy laser beams and applying an external magnetic field on each of the magnetic domains. Then, the magneto-optic disc device irradiates each magnetic domain with laser beams which are linearly polarized in a predetermined direction, detects a rotational direction of a plane of polarization of reflected light beams which rotates in accordance with the magnetized direction of each magnetic domain by Kerr effect, and reads the information recorded on the optical disc based on variations in the detected rotational direction of the plane.

Information is recorded on and read from any recording tracks of the magnetic film. Therefore, the optical pick-up of an optical disc device is required to move in the direction of tracking, while maintaining the angle between a beam axis of the laser beam incident on the disc, and a disc surface to be a right angle. In an example of a conventional configuration designed for this purpose, the whole optical pick-up is made to move in the direction of the tracking. However, in recent years, it has become normal to adopt a configuration wherein the optical pick-up is divided into a moving optical system and a fixed optical system, the purpose being to shorten seek time. With the latter configuration, the fixed optical system which includes a light-emitting device (laser diode etc.) and a detecting device for detecting reflected light, is fixed in the optical disc device, while the beam axis of the laser beam emitted from the fixed optical system is extended in the direction of tracking. In addition, the reflecting mirror which deflects this beam axis at right-angles towards the disc and the objective lens are configured as a moving optical system, the whole of which is moved along the beam axis. Consequently, in this configuration, a rail on which the moving optical system slides is provided on the base plate of the optical disc device in parallel to the beam axis of the fixed optical system.

However, if the beam axis of the fixed optical system and the rail are inclined with respect to each other, the beam axis becomes displaced from the center of the objective lens of the moving optical system as the whole moving optical system moves, thus causing the beam spot on the disc surface to deteriorate, and the amount of reflected be am s which is received by the detecting device in the fixed optical system changes. Consequently, it is necessary to ensure that the beam axis of the fixed optical system and the rail are actually parallel.

In the conventional method of ensuring that they are parallel, the rail and a standard guide face are formed on the same base plate in a predetermined positional relationship, therefore, a sub-base plate on which the fixed optical system is assembled and the beam axis is beforehand adjusted was pressed against the standard guide face and fixed in this position.

Nevertheless, during molding of the base plate it is impossible to avoid slight errors in relative positions of the rail and the standard guide face. Further, it is essentially impossible to eliminate errors entirely in the fixed optical system. These errors are compounded by fixing the fixed optical system on the standard guide face, resulting in the compounded errors sometimes exceeding the permissible range. Thus, even by using the standard guide face to fix the fixed optical system to the base plate, it has been impossible to eliminate errors in the parallel relationship between the beam axis of the laser beam in the fixed optical system and the rail, which has meant that it has also not been possible to achieve optimum performance of the optical pick-up.

SUMMARY OF THE INVENTION

It is a primary object of the present invention, which was conceived in view of the above problems, to eliminate errors in the parallel relationship between the beam axis of the beam which is emitted from the fixed optical system to the moving optical system and the rail on which the moving optical system slides simply and with high precision.

According to a first aspect of the present invention, the method of adjusting a beam axis comprises the steps of positioning a plane-parallel plate made of a transparent material on the track, with its plane surface, which reflects part of the beam emitted from a fixed optical system, in a direction perpendicular to the track, positioning an optical element which reflects and emits the beam in the direction of incidence thereof on a side of the plane-parallel plate other than the side of the fixed optical system, separating the reflected beam which is reflected by the plane surface of the plane-parallel plate and the reflected beam which is reflected by the optical element from the axis of the beam emitted from the fixed optical system, projecting the separated beams on a plane, and adjusting the direction of the beam emitted from the fixed optical system in such a manner that the light points of the respective reflected beams formed on the plane overlap or coincide with each other.

According to a second aspect of the present invention, the method comprises the steps of positioning two plane-parallel plates made of a transparent material at an interval from each other on the track, with their plane surfaces, which reflect part of the beam emitted from the fixed optical system, directed in a direction perpendicular to the track, separating the reflected beams which are reflected by the respective plane surfaces of the plane-parallel plates from the optical path of the emitted beam from the fixed optical system, projecting the separated beams on a plane, and adjusting the direction of the beam emitted from the fixed optical system in such a manner that the light points of the respective reflected beams formed on the plane overlap or coincide with each other.

The optical disc may be a compact disc, a video disc, a video CD, a CD-ROM or other type of optical disc, and it may be a magneto-optic disc, a phase-change type disc, a write-once disc, a DVD or other writable disc.

The optical pick-up may be a read-only optical pick-up provided for an optical disc device, or it may be a write/read optical pick-up provided for a magneto-optic disc device, a phase-change type disc device, a write-once disc device, a DVD disc device or the like.

In the case that the pick-up is for a magneto-optic disc device, the fixed optical system emits linearly polarized light as the light beam and detects the angle of rotation of reflected light. In the case that it is for an optical disc device, a phase-change type disc device or a write-once disc device, there is no need for the beam emitted by the fixed optical system to be polarized light, and the fixed optical system detects changes in the strength of reflected light.

Thus, inasmuch as the fixed optical system emits the beam and detects reflected light, it is preferable to provide a half-mirror or beam splitter within the fixed optical system.

The fixed optical system may have a reflecting optical system for reflecting the beam in the direction of the moving optical system. In this case, the direction in which the beam is emitted may be adjusted by adjusting the direction of this reflecting optical system. This means that only a small member needs to be moved for the purpose of adjusting the beam axis, thus making the process of adjustment simpler.

On the other hand, the fixed optical system may be assembled on a sub-base plate positioned on the base. In this case, the direction in which the beam is emitted is adjusted by adjusting the direction of this sub-base plate relative to the base.

The moving optical system may have a reflecting optical system (that is, a reflecting mirror or a reflecting prism) for reflecting the beam in the direction of the optical disc.

The optical element or system may be a corner cube, or it may be some other type of optical system.

In the case where the above mentioned reflecting optical system is provided in the moving optical system, the optical element or system may be positioned in such a manner that it reflects the beam which has been reflected by the reflecting optical system. If constructed in this manner, the adjustment can be practiced in a state closer to use.

This optical element may be positioned on the opposite side of the plane-parallel plate from the fixed optical system. This makes the operation of installing the optical element simpler, thus rendering it easier to adjust the beam axis.

The track is designed so that its longitudinal direction is parallel to the radial direction of the optical disc. In the case where the track consists of two parallel rails, the plane-parallel plate may have two surfaces, each of which forms a right-angle with its plane face and is contacted against one of the two rails. If constructed in this way, all that is required in order to ensure that the front face of the plane-parallel plate is directed in a direction perpendicular to the longitudinal direction of the rails is to insert the plane-parallel plate between the rails, thus rendering the process of adjusting the beam axis simpler.

The plane on which the beams are projected may be a sensing plane of an image sensor television camera, or a screen plane. Especially, in the case where the second aspect of the present invention is adopted, it is effective to use a simple image plane because the two reflected lights are parallel to each other and it is impossible to use a camera lens.

Moreover, the image plane may be configured as a screen on which the reflected light is projected.

BRIEF DESCRIPTION OF THE DRAWINGS

The invention will be described below in detail with reference to the accompanying drawings in which.

DETAILED DESCRIPTION OF THE PREFERRED EMBODIMENTS

The present disclosure relates to subject matter contained in Japanese Patent Application No. 7-173435 (filed on Jul. 10, 1995), which is expressly incorporated herein by reference in its entirety.

Preferred embodiments of the present invention will now be described with reference to the accompanying drawings.

First Embodiment

This first embodiment illustrates an example wherein the optical pick-up according to the first aspect of the present invention is embodied in an optical pick-up for a magneto-optic disc device.

Figure 1:
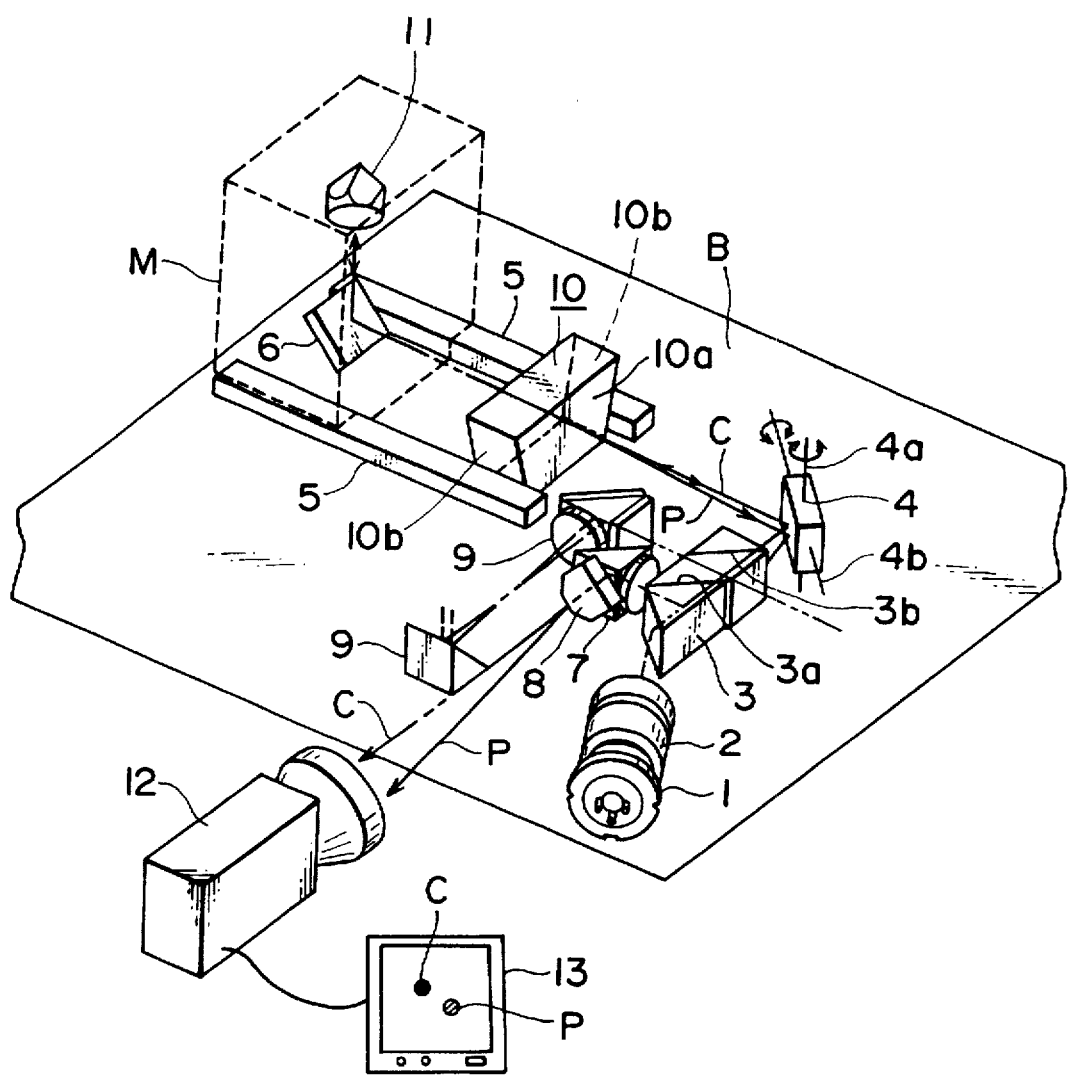
FIG. 1 is an oblique view of an optical pick-up wherein the method of adjusting the optical axis according to a first embodiment is adopted.

FIG. 1 is an oblique view which illustrates the structure of the optical pick-up of the first embodiment during adjustment of the beam axis of an incident laser beam which is emitted from the fixed optical system to the moving optical system and irradiated on a magneto-optic disc. Consequently, FIG. 1 does not show the device for generating an external magnetic field applied to the magnetic domains which are irradiated by high-energy laser beams when information is written on a magneto-optic disc, nor does it show any of the other constituent parts. An explanation follows of the function of the device during use of the optical pick-up.

In FIG. 1, a laser beam emitted from a laser diode 1 passes through a collimator lens 2, a polarization beam splitter 3, a movable mirror 4 and a sliding mirror 6, and is focused on the magnetic film of a magneto-optic disc (not shown) by means of an objective lens also not shown in the drawing (FIG. 1 shows a cat's-eye optical system (i.e., corner-reflector) 11 in place of the objective lens). When information is to be read from the magneto-optic disc, reflected light from the magnetic film of the magneto-optic disc (not shown) returns and traces the same optical path as far as the polarization beam splitter 3. Then, the reflected light is separated from the optical path and passes through a reflecting prism 7 and a half-wave plate 8 to be received by a device which detects the direction of the plane of polarization and which is not shown in the drawing (FIG. 1 shows a television camera 12 in place of the detecting device). Moreover, part of the reflected light from the magnetic film of the magneto-optic disc (not shown) passes through a relay optical system 9a and 9b and is incident upon a servo detection system which is not shown in the drawing.

Among all of these optical elements, only the sliding mirror 6 and the objective lens (not shown) comprise a moving optical system and are provided in a moving carriage M represented with a dotted line. This moving carriage M slides along two parallel rails 5 which are formed integrally on a base plate B of the optical pick-up and which is designed so that its longitudinal direction is parallel to the radial direction of the magneto-optical disc (not shown), driven by a tracking drive device which is not shown in the drawing. All of the optical elements other than the sliding mirror 6 and the objective lens (not shown) comprise a fixed optical system and are fixed on the base plate B with the exception of the movable mirror 4. Descriptions follow of each of the optical elements.

Laser diode 1 emits a laser beam consisting only of linearly polarized light. The laser diode 1 emits low-energy light at a constant power during reading, while emitting high-energy light at a strength which is modulated in accordance with the write signals during writing.

Collimator lens 2 collimates the laser beam.

Polarization beam splitter 3 has a polarizing separating plane 3a and a half-mirror plane 3b therein, both of which incline at 45° to the axis of the laser beam. This polarizing separating plane 3a reflects respectively 20% and 2% of the P and S polarized light components of the laser beam which is incident on it, while the half-mirror plane 3b reflects part of each component in the same proportion.

Movable mirror 4 is a mirror which reflects light on its outer surface. This movable mirror 4 is set on the base plate B in such a manner as to rotate freely around axes 4a and 4b which intersect to each other at right-angles. Consequently, this movable mirror 4 is capable of facing in all directions relative to the laser beam which has passed through the polarization beam splitter 3. The direction of this movable mirror 4 is adjusted in such a manner that the axis of the laser beam after it has been reflected is parallel to the rails 5.

The sliding mirror 6 reflects the laser beam which has been reflected by the movable mirror 4 in a direction relative to the base plate B, and directs it to the magneto-optic disc (not shown). This sliding mirror 6 slides along the rails 5 with the moving carriage M, and tracks on the magneto-optic disc (not shown). If the axis of the laser beam and the rails 5 are parallel with each other, the reflected position of the laser beam on the sliding mirror 6, the incident position at which the laser beam is made incident upon the objective lens (not shown), the state of the spot on the magnetic film of the magneto-optic disc (not shown) and the position of the axis of the reflected light beam are unchanged, independent of the movement of the moving carriage M.

The objective lens (not shown) focuses the parallel laser beam reflected by the sliding mirror 6 on the magnetic film of the magneto-optic disc (not shown).

The reflecting prism 7 causes the laser beam, which has been reflected on the magnetic film of the magneto-optic disc (not shown), has returned as far as the polarization beam splitter 3, and has been separated by the polarized light separating plane 3a, to be reflected in the direction of the half-wave plate 8.

The half-wave plate 8 is an optical rotary plate which rotates the direction of the plane of polarization of the laser beam passing therethrough at a predetermined angle so that the direction of the plane of polarization can be detected simply and highly precisely by the detecting device (not shown).

The detecting device for detecting the direction of the plane of polarization (not shown) is a device which extracts the polarized light component in a specific direction of the laser beam after its plane of polarization has been rotated by the half-wave plate 8, detects the rotational state of the plane of polarization, and outputs the detected result in the form of a digital electric signal.

There follows a description of the procedure for adjusting the beam axis when assembling the optical pick-up of the magneto-optic disc device described above.

The beam axis adjusting is practiced after the laser diode 1, the collimator lens 2, the polarization beam splitter 3, the reflecting prism 7, the half-wave plate 8 and the relay optical system 9a and 9b have been fixed onto the upper surface of the base plate B on which the rails 5 are formed, the movable mirror 4 has been fitted in such a manner as to be capable of inclining, and the moving carriage M fitted on the rails 5. In other words, it is adjusted before fitting the objective lens and the detecting device (not shown), as is illustrated in FIG. 1.

Firstly, the cat's-eye optical system 11 is placed in the position in the moving carriage M where the objective lens is intended to be fit. The cat's-eye optical system 11 (or corner reflector) is configured from a corner cube, so that it can reflect an incident light beam parallel to the direction of incidence of the incident light beam even if it is fitted in an inclined position. In order to ensure that the incident and reflected beams are coaxial, the vertex of the cat's-eye optical system 11 is positioned where the central axis of the objective lens is to be positioned. If the cat's-eye optical system 11 is configured from an array of small corner cubes, the position thereof might be rough.

Next, the television camera 12 is positioned where the detecting device is to be fitted. The television camera 12 does not detect the absolute position of the optical axis, and there is therefore no need to position it precisely. However, it must be positioned in such a manner that the images of the laser beams scattered within a certain range can be picked up. A monitor device 13 is connected to a television camera 12 for the purpose of displaying the image which is picked up.

Next, a reference prism 10 is positioned between the rails 5. The reference prism 10 is made of a transparent plane-parallel glass (which is to say, a plane-parallel plate of a transparent substance) having a trapezoidal front surface 10a. The two side surfaces 10b of this reference prism 10 are at right-angles to the front surface 10a, and the width between the side surfaces 10b becomes narrower towards the bottom thereof. In other words, the width of the upper edge of the reference prism 10 is wider than the space between the rails 5, while that of the lower edge is narrower than the space between the rails 5. Thus, if this reference prism 10 is only placed between the rails 5, the position is restricted by line contact between the side surfaces 10b and the rails 5 in such a manner that the front surface 10a is directed in a direction perpendicular to the rails 5. The front surface 10a of the reference prism 10 is coated in such a manner as to increase reflection.

Next, the laser diode 1 is caused to oscillate and emit a laser beam. The laser beam passes through the polarization beam splitter 3 and is reflected by the movable mirror 4.

Next, the direction of the movable mirror 4 is adjusted roughly, and the reflected laser beam is directed through the reference prism 10 and the sliding mirror 6 onto the center of the cat's-eye optical system 11. Then, by the function of the cat's-eye optical system 11, the incident laser beam is reflected and the reflected light beam C returns along the axis of the incident laser beam. The reflected light beam C is then separated by the polarizing separating plane 3a of the polarization beam splitter 3, and directed into the television camera. Consequently, a light spot of the reflected light beam C from the cat's-eye optical system 11 is displayed on the monitor device 13.

At the same time, part of the laser beam is reflected by the front surface 10a of the reference prism 10. If the axis of the laser beam which is incident on the reference prism 10 is not perpendicular to the front surface 10a, in other words, if the axis of the incident laser beam is not parallel to the rails 5 (that is, the direction in which the moving optical system moves), the axis of reflected light beam P on the front face 10a will be inclined relative to the axis of the incident laser. Consequently, this reflected light beam P reflected at the reference prism 10 will also be inclined relative to the reflected light beam C from the cat's-eye optical system 11. This reflected light beam P is also directed into the television camera 12, and the position of the light spot is displayed on the monitor 13, in the same way as the reflected light C from the cat's-eye optical system 11.

Next, an operator adjusts the movable mirror 4 with precision while looking at the monitor 13 so that the light spot of the reflected light beam P reflected at the reference prism 10 is overlapped with the light spot of the reflected light beam C from the cat's-eye optical system 11. With both light spots overlapping, the axis of the reflected light beam P reflected at the reference prism 10 overlaps the axis of the reflected light beam C from the cat's-eye optical system 11. Consequently, the axis of the reflected light beam P reflected at the reference prism 10 will overlap the axis of the incident beam. The axes of the reflected light beams P and C overlap in this way because the axis of the incident laser beam is perpendicular to the front surface 10a of the reference prism 10. This means that the axis of the incident laser beam has been adjusted in such a manner that it is parallel to the direction in which the moving optical system moves. Then, in this state, the operator pours an adhesive between the movable mirror 4 and the base plate B, resulting in the movable mirror 4 being fixed relative to the base plate B.

As has been described above, inasmuch as the axis of the incident laser beam are adjusted in a state that the principal parts of the fixed optical system (the optical elements necessary for transmitting the laser beam: laser diode 1, collimator lens 2, polarization beam splitter 3 and movable mirror 4) and the principal part of the movable optical system (sliding mirror 6) have been fitted on to the base plate B in accordance with this embodiment, even if there are slight errors in the positions where the various optical elements of the fixed optical system are fitted, these are subjected to a final overall adjustment of the optical axes. Therefore it is possible to reduce the total number of processes for adjustments of the axis.

Moreover, since this state is very close to the state in which the optical pick-up is used, the optical pick-up can be completed from this state without any risk that the addition of other parts (objective lens) will cause any error in the parallel relationship between the rails 5 and the axis of the incident laser beam. Consequently, when a completed optical pick-up is used, independently to the movement of the moving carriage M, the laser beam is always reflected in the same place on the sliding mirror 6, is always incident on the same place of the objective lens, always forms a laser light spot of the same state on the magnetic film of the magneto-optic disc, and always keeps the reflected optical axis in the same position.

Moreover, the cat's-eye optical system 11, reference prism 10 and television camera 12 which are used in the process of adjusting the beam axis do not require precise adjustments to their positions, which means that adjustment of the optical axes can be achieved simply and with high precision.

Second Embodiment

This second embodiment also illustrates an example wherein the optical pick-up according to the first aspect of the present invention is embodied in an optical pick-up for a magneto-optic disc device.

Figure 2:
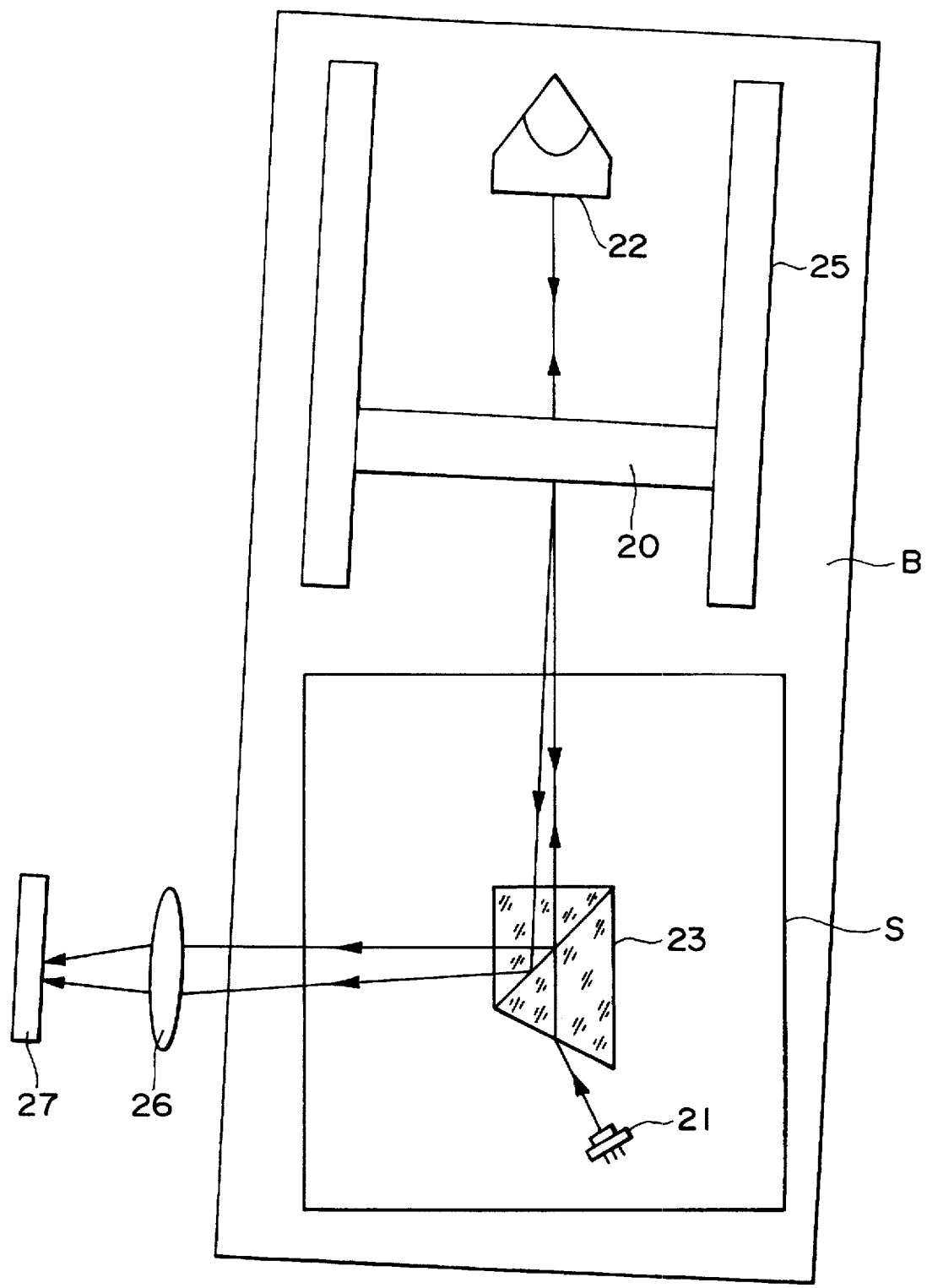
FIG. 2 is a top view of an optical pick-up wherein the method of adjusting the optical axis according to a second embodiment is adopted.
Figure 3:
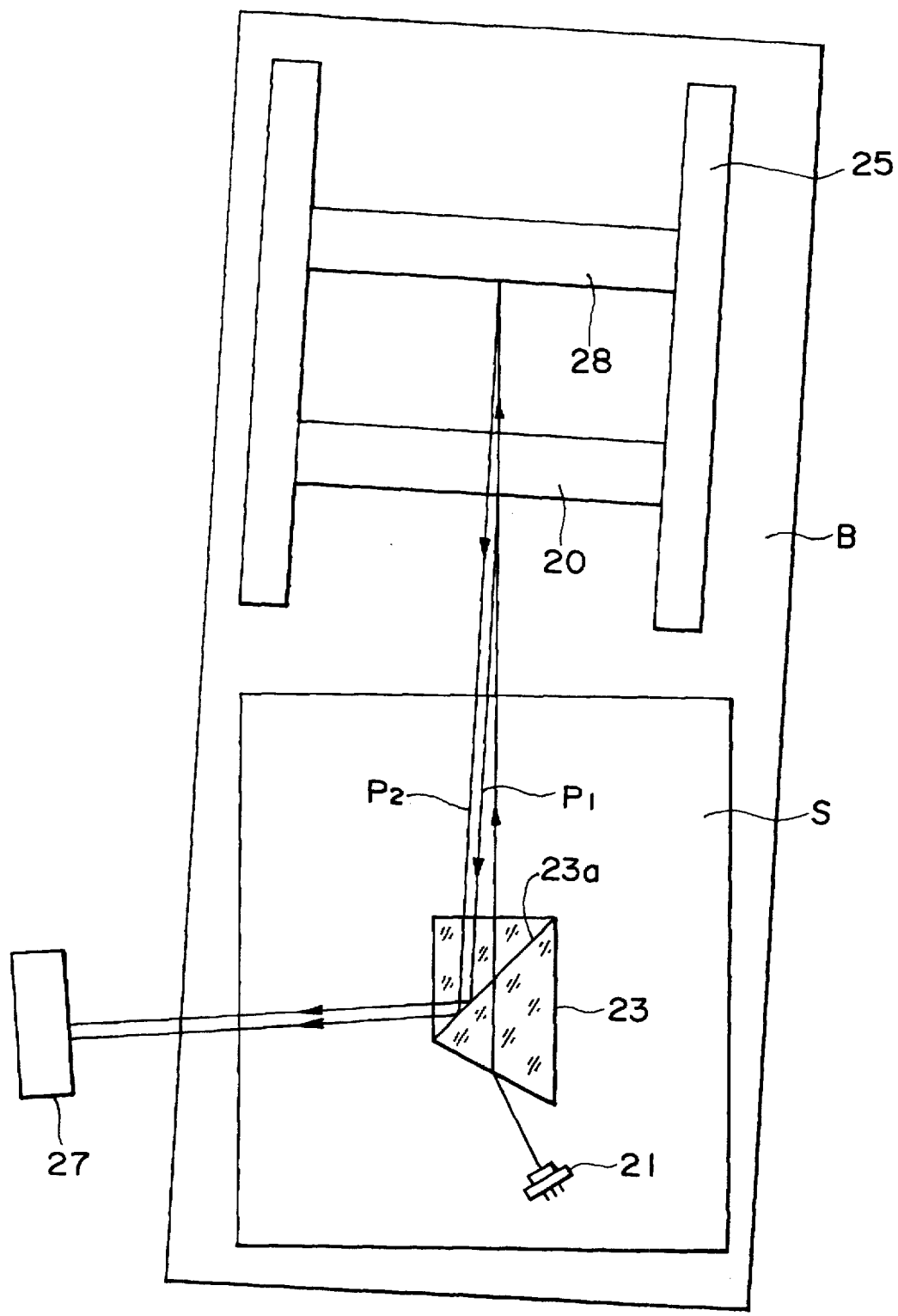
FIG. 3 is a top view of an optical pick-up wherein the method of adjusting the optical axis according to a third embodiment is adopted.

As is shown in FIG. 2, the optical pick-up of the second embodiment has a structure that a sub-base plate S on which a fixed optical system (laser diode 21 and polarization beam splitter 23) is assembled has been fitted on a base plate B on which rails 25 for the purpose of moving a moving optical system are formed.

The fixed optical system of this optical pick-up has no movable mirror 4 like the one in the first embodiment. Consequently, the axis of the laser beam which has passed through the polarization beam splitter 23 needs to be adjusted parallel to the rails.

With the second embodiment, It is not possible to adjust the beam axis by means of a movable mirror 4 as in the first embodiment, but it is possible to do so by adjusting the angle of the whole sub-base plate S relative to the base plate B.

Moreover, while the cat's-eye optical system 11 is placed in the moving carriage M in the above mentioned first embodiment, the cat's-eye optical system 22 is placed on the base plate B between the rails 25 in the second embodiment.

Furthermore, with the present second embodiment, the beam axis is adjusted in a state that the reflecting prism 7 and the half-wave plate 8 have not been fitted yet.

In FIG. 2, 26 denotes the lens of the television camera, while 27 denotes an image sensor of the television camera, and 20 denotes the reference prism.

The function of each constituent in the second embodiment is the same as that of the constituent with the same name in the first embodiment, and a description here will therefore be omitted.

In the second embodiment, the angle of the sub-base plate S relative to the base plate B is adjusted so that the two light points formed on the image sensor 27 overlap each other. With the two light points overlapping, the reflected light beam from the cat's-eye optical system 22 overlaps the reflected light beam reflected at the front surface of the reference prism 20. The two beams overlap in this way because the axis of the incident beam is perpendicular to the front surface of the reference prism 20. This means that the axis of the incident laser beam has been adjusted in such a manner that it is parallel to the direction in which the moving optical system moves. Thus, in this state, the operator pours an adhesive between the sub-base plate S and the base plate B, resulting in that the sub-base plate S is fixed relative to the base plate B.

Other operations and functions in the second embodiment are the same as those in the first embodiment. The structure of the optical pick-up of this second embodiment is closer to the structure described under prior art (in which, the fixed optical system is assembled separately before being fixed to the base plate), with the result that the method of adjusting the optical axes to which the present invention is embodied can be adopted by the simple modification of removing the standard guide face from a conventional optical pick-up. Incidentally, the image sensor 27 in the second embodiment can be a screen.

Third Embodiment

The third embodiment also illustrates an example wherein the optical pick-up according to the second aspect of the present invention is embodied in an optical pick-up for a magneto-optic disc device.

The third embodiment differs from the second embodiment only in that a second reference prism replaces the cat's-eye optical system 22, and that the lens 26 of the camera has been removed to leave only the image sensor 27. Consequently, a description of the functions of other constituents here will be omitted.

The second reference prism 28 has exactly the same shape and functions as the first reference prism 20. Consequently, if the axis of the incident laser beam is not perpendicular to its front surface, in other words, if the axis of the incident laser beam and the rails 25 are not parallel, the reflected light beam $p_2$ reflected at the front surface of the second reference prism 28 will be inclined relative to the axis of the incident laser beam, in the same way as the reflected light beam $p_1$ reflected at the front face of the first reference prism 20. These reflected light beams $p_1$ and $p_2$ are parallel to each other, but a space is generated between them when they are inclined relative to the axis of the incident laser beam, because of the difference in their reflected positions.

Having thus been reflected parallel, the reflected light beams $p_1$ and $p_2$ maintain their parallel state and are reflected by the polarizing separating plane 23a of the polarization beam splitter 23 to form light points on the image sensor 27. Here the lens of the second embodiment has been removed in order to prevent the two reflected light beams $p_1$ and $p_2$ from merging into one point.

In the third embodiment, the angle of the sub-base plate S relative to the base plate B is adjusted so that the two light points formed on the image sensor 27 overlap each other. With the two light points overlapping, the reflected light beams $p_1$ and $p_2$ as well as the incident laser beam all have the same axis. This means that the axis of the incident laser beam has been adjusted in such a manner that it is parallel to the direction in which the moving optical system moves. Thus, in this state, the operator pours an adhesive between the sub-base plate S and the base plate B, resulting in that the sub-base plate S is fixed relative to the base plate B. Other operation and functions in the third embodiment are the same as those in the first and second embodiments.

By adjusting the axis of the incident laser beam after the fixed optical system has been assembled on the base plate, the method of adjusting the axis in an optical pick-up configured in the above manner makes it possible to eliminate errors in the parallel relationship between the axis of a beam from the fixed optical system to the moving optical system and the rail.

What is claimed is:

1. A method of adjusting a beam axis of an optical pick-up having a fixed optical system which is positioned on a base, and a moving optical system which reflects a beam emitted by the fixed optical system to an optical disc, while the moving optical system moves along a track formed on the base, comprising the steps of:
    positioning a plane-parallel plate made of a transparent material on the track, with a plane surface of said plane-parallel plate extending in a direction perpendicular to the track, said plane surface reflecting part of the emitted beam;
    positioning an optical system which reflects and emits the beam in a direction of incidence of the beam on an other side of the plane-parallel plate than a side of the fixed optical system;
    separating the beam which is reflected by said plane surface of the plane-parallel plate and the beam which is reflected by the optical system from the optical path of the beam emitted from the fixed optical system;
    projecting the separated beams on a plane; and
    adjusting the direction of the beam emitted from the fixed optical system such that the light points of the respective reflected beams formed on the plane coincide with each other.

2. A method of adjusting a beam axis of an optical pick-up according to claim 1, wherein the moving optical system has a reflecting optical system which reflects the emitted beam to the optical disc, and wherein
    the optical system reflects the beam which is reflected by the reflecting optical system.

3. A method of adjusting a beam axis of an optical pick-up according to claim 1, wherein the optical system is a corner cube.

4. A method of adjusting a beam axis of an optical pick-up according to claim 1, wherein the fixed optical system has a reflecting optical system which reflects the emitted beam to the moving optical system, and wherein
    the adjustment of the direction of the emitted beam is effected by adjusting the direction of the reflecting optical system.

5. A method of adjusting a beam axis of an optical pick-up according to claim 1, wherein the fixed optical system is fixed on a sub-base plate which is positioned on the base plate, and wherein
    the adjustment of the direction of the emitted beam is effected by adjusting the direction of the sub-base plate relative to the base plate.

6. A method of adjusting a beam axis of an optical pick-up according to claim 1, wherein the plane on which the separated beams are projected is the sensing plane of image sensor of a television camera.

7. A method of adjusting a beam axis of an optical pick-up according to claim 1, wherein the track consists of two parallel rails, and wherein
    the plane-parallel plate has two surfaces, each of which forms a right-angle with said plane surface and is in contact with one of the two rails.

8. A method of adjusting a beam axis of an optical pick-up having a fixed optical system which is positioned on a base, and a moving optical system which reflects a beam emitted by the fixed optical system to an optical disc, while moving along a track formed on the base, comprising the steps of:
    positioning two plane-parallel plates made of a transparent material spaced from each other on the track, with respective surfaces of the plane-parallel plates extending in a direction perpendicular to the track, said respective plane surfaces reflecting part of the beam emitted from the optical system;
    separating the beams which are reflected by the respective plane surfaces of the plane-parallel plates from the optical path of the emitted beam;
    projecting the separated beams on a plane; and
    adjusting the direction of the beam emitted from the fixed optical system such that the light points of the respective reflected beams formed on the plane coincide with each other.

9. A method of adjusting a beam axis of an optical pick-up according to claim 8, wherein the track consists of two parallel rails, and wherein
    each plane-parallel plate has two surfaces, each of which forms a right-angle with a respective plane surface and is in contact with one of the two rails.

10. A method of adjusting a beam axis of an optical pick-up according to claim 8, wherein the plane on which the separated beams are projected is a screen.

11. A method of adjusting a beam axis of an optical pick-up having a fixed optical system which is positioned on a base, and a moving optical system which reflects the beam emitted by the fixed optical system to the optical disc, while moving along a track formed on the base, comprising the steps of:
    providing a first reflecting optical system having a reflecting surface which allows part of the emitted beam to pass therethrough and reflects an other part of the emitted beam in a direction related to a longitudinal direction of the track;
    providing a second reflecting optical system which reflects the beam passed through the first reflecting optical system to the fixed optical system;

separating the beam which is reflected by the first reflecting optical system and the beam which is reflected by the second reflecting optical system from the optical path of the beam emitted from the fixed optical system, projecting the separated beams on a plane; and adjusting the direction of the beam emitted from the fixed optical system such that the light points of the respective reflected beams formed on the plane coincide with each other.

* * * * *